(12) United States Patent
Ganiger et al.

(10) Patent No.: US 11,852,027 B2
(45) Date of Patent: *Dec. 26, 2023

(54) SHAPE MEMORY ALLOY SLEEVE SUPPORT ASSEMBLY FOR A BEARING

(71) Applicant: General Electric Company, Schenectady, NY (US)

(72) Inventors: Ravindra Shankar Ganiger, Bangalore (IN); Praveen Sharma, Bangalore (IN); Bhujabal Prashant Mahadeo, Bangalore (IN); Shivam Mittal, Bangalore (IN)

(73) Assignee: General Electric Company, Schenectady, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/329,220

(22) Filed: May 25, 2021

(65) Prior Publication Data
US 2021/0277800 A1 Sep. 9, 2021

Related U.S. Application Data

(63) Continuation of application No. 16/535,231, filed on Aug. 8, 2019, now Pat. No. 11,021,998.

(51) Int. Cl.
  *F01D 25/16* (2006.01)
  *F16C 35/06* (2006.01)
  *F01D 25/00* (2006.01)

(52) U.S. Cl.
  CPC ......... *F01D 25/164* (2013.01); *F01D 25/005* (2013.01); *F16C 35/06* (2013.01); *F05D 2220/32* (2013.01); *F05D 2240/50* (2013.01); *F05D 2260/96* (2013.01); *F05D 2300/17* (2013.01); *F05D 2300/505* (2013.01); *F16C 2360/23* (2013.01)

(58) Field of Classification Search
  CPC ...... F01D 25/16; F01D 25/162; F01D 25/164; F01D 25/166; F02C 7/06; F05D 2240/50; F05D 2240/54; F05D 2300/505; F16C 27/045; F16C 2202/28
  See application file for complete search history.

(56) References Cited

U.S. PATENT DOCUMENTS

| 4,214,796 A | 7/1980 | Monzel et al. |
| 4,527,910 A | 7/1985 | Fleming |

(Continued)

FOREIGN PATENT DOCUMENTS

| CN | 20299015 U | 6/2013 |
| CN | 106013498 A | 10/2016 |

(Continued)

*Primary Examiner* — Topaz L. Elliott
(74) *Attorney, Agent, or Firm* — Dority & Manning, P.A.

(57) ABSTRACT

A support assembly for a bearing of a gas turbine engine includes a shaft extending along an axial direction. The support assembly includes an outer race positioned radially exterior to the bearing such that the outer race supports the bearing. Additionally, the support assembly includes a shape memory alloy damper positioned radially exterior to the outer race and at least partially supporting the outer race. Moreover, the shape memory alloy damper includes a plurality of sleeves. One or more sleeves of the plurality of sleeves include a shape memory alloy material.

6 Claims, 9 Drawing Sheets

(56) References Cited

U.S. PATENT DOCUMENTS

| | | | |
|---|---|---|---|
| 7,004,047 B2 | 2/2006 | Rey et al. | |
| 7,367,776 B2 | 5/2008 | Albers et al. | |
| 8,136,999 B2 | 3/2012 | Mons et al. | |
| 8,209,834 B2 | 7/2012 | Mons et al. | |
| 8,291,710 B2 | 10/2012 | Webster | |
| 8,337,090 B2 * | 12/2012 | Herborth | F16C 27/045 384/582 |
| 8,430,622 B2 | 4/2013 | Webster et al. | |
| 8,500,406 B2 | 8/2013 | Jimenez et al. | |
| 8,662,756 B2 | 3/2014 | Care et al. | |
| 8,830,026 B2 | 9/2014 | Mooney et al. | |
| 9,581,145 B2 | 2/2017 | Jasklowski | |
| 9,683,600 B2 | 6/2017 | Park | |
| 9,796,581 B2 | 10/2017 | Landais et al. | |
| 10,539,074 B2 * | 1/2020 | Noda | F16C 27/045 |
| 10,634,007 B2 * | 4/2020 | Ghosh | F16C 35/063 |
| 10,801,366 B2 * | 10/2020 | Ganiger | F16C 35/042 |
| 10,995,511 B2 | 5/2021 | Zhang et al. | |
| 2006/0269357 A1 | 11/2006 | Webb | |
| 2008/0181763 A1 * | 7/2008 | Webster | F01D 21/045 415/142 |
| 2015/0132109 A1 * | 5/2015 | Sumimoto | F04D 19/042 415/119 |
| 2015/0144256 A1 | 5/2015 | Fabre et al. | |
| 2016/0341070 A1 * | 11/2016 | Garcia | F04D 29/023 |
| 2016/0369652 A1 * | 12/2016 | Morris | F16F 9/30 |
| 2017/0248191 A1 | 8/2017 | Husband et al. | |
| 2018/0073433 A1 * | 3/2018 | Noda | F16C 27/066 |
| 2018/0112554 A1 | 4/2018 | Ghosh et al. | |
| 2018/0274389 A1 * | 9/2018 | Miller | F01D 9/065 |
| 2018/0298822 A1 | 10/2018 | Ac et al. | |
| 2019/0145277 A1 * | 5/2019 | Ghosh | F16C 19/06 384/223 |
| 2019/0162077 A1 | 5/2019 | Ghosh et al. | |
| 2019/0178104 A1 | 6/2019 | Joshi et al. | |
| 2019/0353052 A1 * | 11/2019 | Ganiger | F01D 25/164 |
| 2021/0156257 A1 * | 5/2021 | Pankaj | F01D 5/03 |
| 2022/0154580 A1 * | 5/2022 | Ganiger | F01D 5/10 |
| 2022/0178310 A1 * | 6/2022 | Pankaj | F16H 57/082 |

FOREIGN PATENT DOCUMENTS

| | | | | |
|---|---|---|---|---|
| CN | 106121336 A | | 11/2016 | |
| CN | 205976049 U | | 2/2017 | |
| EP | 2623800 A1 * | | 8/2013 | F16C 17/022 |
| JP | H06200933 A * | | 7/1994 | F16C 17/022 |
| JP | 2008014366 A * | | 1/2008 | F16C 27/066 |
| JP | 2014058932 A * | | 4/2014 | F16C 27/066 |
| WO | WO-8604126 A1 * | | 7/1986 | |

* cited by examiner

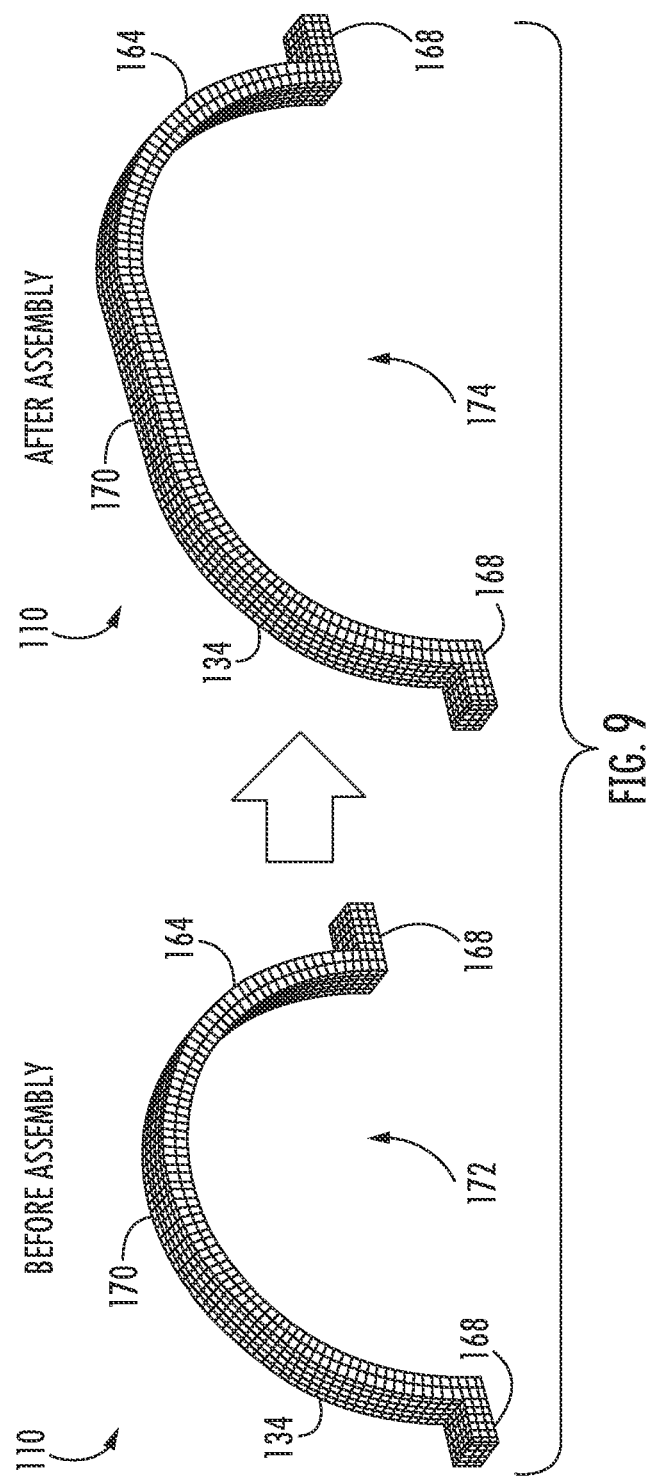

SHAPE MEMORY ALLOY SLEEVE SUPPORT ASSEMBLY FOR A BEARING

CROSS-REFERENCE TO RELATED APPLICATION

This application is a continuation application of U.S. application Ser. No. 16/535,231 filed Aug. 8, 2019, titled "SHAPE MEMORY ALLOY SLEEVE SUPPORT ASSEMBLY FOR A BEARING," herein incorporated by reference.

FIELD

The present subject matter relates generally to a support assembly for a bearing in a gas turbine engine, or more particularly to a support assembly including a shape memory alloy (SMA) sleeve for retention of the outer race of the bearing.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan cases surrounding the fan assembly including the fan blades.

With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), which also is known as the high pressure spool (HP spool). Similarly, the LP compressor is coupled with the LP turbine via a low pressure shaft (LP shaft), which also is known as the low pressure spool (LP spool).

During normal engine operation, a support assembly may be provided to support the bearings of the gas turbine engine. For instance, a ball bearing assembly can be provided to retain the axial position of the HP shaft (aka HP spool), and a roller bearing assembly can be provided to act to provide radial damping of the fan/rotor system. A traditional design approach consisting of an axial spring finger housing combined with a radial squeeze film oil damper can be provided to protect the bearings against damage during relatively small unbalance load situations. During these normal operating conditions, the squeeze film damper bearing requires clearance in all directions around the bearing (radial, tangential & axial) for dynamic operation. However, under no-oil conditions, as well as during conditions in which the rotor assemblies are subjected to a large amount of dynamic forces, the squeeze film dampers may not provide a desired amount of variable damping that can change with respect to the dynamic forces.

As such, a need exists for a support assembly for a bearing of a gas turbine engine that allows for operation in a no-oil condition as well as provides improved damping to the bearing.

BRIEF DESCRIPTION

Aspects and advantages will be set forth in part in the following description, or may be obvious from the description, or may be learned through practice of the invention.

In one aspect, the present subject matter is directed to a support assembly for a bearing of a gas turbine engine including a shaft extending along an axial direction. The support assembly includes an outer race positioned radially exterior to the bearing such that the outer race supports the bearing. Additionally, the support assembly includes a shape memory alloy damper positioned radially exterior to the outer race and at least partially supporting the outer race. Moreover, the shape memory alloy damper includes a plurality of sleeves. One or more sleeves of the plurality of sleeves include a shape memory alloy material.

In one embodiment, the support assembly may further include an additional damper, and the shape memory alloy may be disposed radially between the outer race and at least a portion of the additional damper. In a further embodiment, at least a portion of the plurality of sleeves may be radially stacked. In one such embodiment, the portion of the plurality of sleeves may include a cap sleeve including retaining features at endpoints of the cap sleeve. As such, the cap sleeve may be configured to retain the remaining sleeves of the portion of the plurality of sleeves within the retaining features. In a further embodiment, the plurality of sleeves may include at least one leaf damper. In another embodiment, one or more sleeves of the plurality of sleeves may be pre-stressed.

In an additional embodiment, the additional damper may include a squeeze film damper configured to provide damping to the outer race. In a further embodiment, the squeeze film damper may be positioned radially exterior to the shape memory alloy damper such that the squeeze film damper and shape memory alloy damper define a fluid reservoir therebetween. In one such embodiment, at least a portion of the plurality of sleeves may be radially stacked such that a fluid passage is defined at least partially through the portion of the plurality of sleeves. Furthermore, the fluid passage may be fluidly coupled to the fluid reservoir. In a further such embodiment, the stacked portion of the plurality of sleeves may define one or more radial squeeze film gaps between stacked sleeves. Additionally, the squeeze film gaps may be configured to receive a fluid. In a further embodiment, the additional damper may include a squirrel casing configured to provide damping to the outer race. In one such embodiment, the shape memory alloy damper and squeeze film damper may be positioned between a radially innermost portion and a radially outermost portion of the squirrel casing.

In another embodiment, the shape memory alloy damper may include an outer ring and an inner ring positioned radially interior to the outer ring such that the inner ring and outer ring define a gap therebetween. In such an embodiment, the plurality of sleeves may be configured as curved beams. Moreover, each curved beam may be coupled to one of the inner or outer ring at ends of the curved beam and extend to the other of the inner or outer ring. In a further such embodiment, the plurality of curved beams may be arranged within the gap in a circumferential direction.

In another aspect, the present subject matter is directed to a gas turbine engine defining a central axis. The gas turbine engine includes a shaft extending along the central axis. The gas turbine engine further includes a compressor attached to the shaft and extending radially about the central axis. Additionally, the gas turbine engine includes a combustor positioned downstream of the compressor to receive a compressed fluid therefrom. The gas turbine engine also includes a turbine mounted on the shaft downstream of the combustor to provide a rotational force to the compressor. The gas turbine engine further includes a bearing assembly supporting the shaft. The bearing assembly includes an inner race coupled to the shaft, a bearing positioned radially exterior to the inner race and supporting the shaft, and an outer race positioned radially exterior to the bearing such that the bearing is radially positioned between the inner and outer races. The gas turbine engine further includes a shape memory alloy damper positioned radially exterior to the outer race and at least partially supporting the outer race. The shape memory alloy damper includes a plurality of sleeves. Furthermore, one or more sleeves of the plurality of sleeves include a shape memory alloy material. It should be further understood that the gas turbine engine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 9 illustrates a pictorial view of an embodiment of the curved beam of the ringed shape memory alloy damper in accordance with aspects of the present subject matter, particularly illustrating the curved beam before and after assembly to form the ringed shape memory alloy damper;

Figure 1:
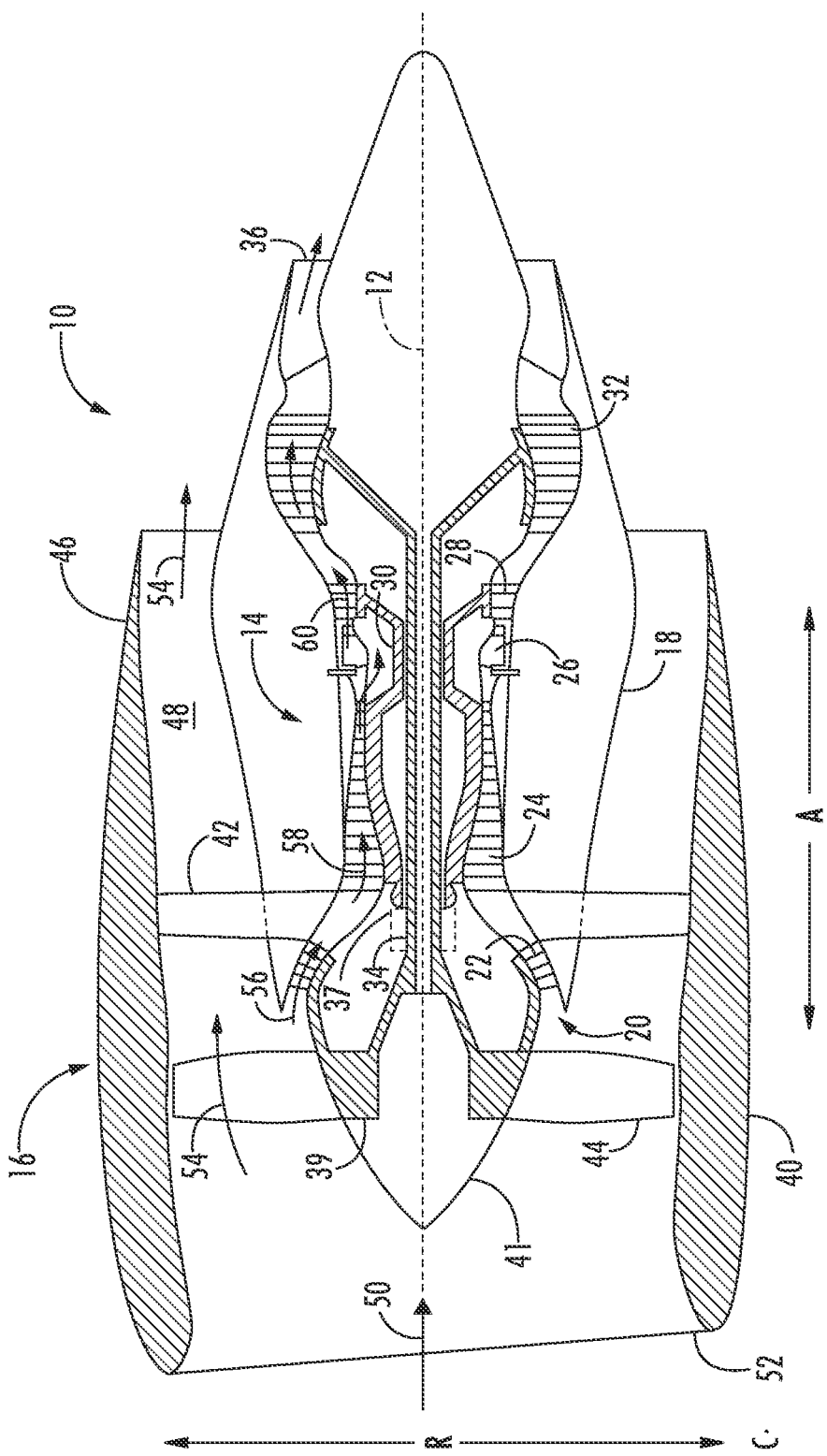
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A support assembly for a bearing of a gas turbine engine is generally provided. The support assembly generally supports a bearing supporting a shaft of the gas turbine engine. The support assembly includes an outer race radially exterior to the bearing to support the bearing and a damper radially exterior to the outer race to both support and provide damping to the outer race. Additionally, the support assembly includes a shape memory alloy damper positioned radially exterior to the outer race to both support and provide damping of the outer race. Further, the shape memory alloy damper includes two or more sleeves. One or more of the sleeves include a shape memory alloy material. As such, the shape memory alloy damper may provide damping to the outer race and/or bearing under compression as forces are transferred through the shape memory alloy damper. For example, bending or flexing of the sleeves formed from the shape memory alloy material may provide damping to the outer race and/or bearing. As such, the support assembly may generally allow for hysteresis damping. Additionally, the support assembly may reduce the weight of the gas turbine engine and lead to increased efficiency. Further, by including the shape memory alloy damper, the support assembly may allow for backup damping in a no oil condition. The support assembly described herein may also generally reduce vibrations caused from rotor bow, improve stability, safety, and reliability, and may easily be retrofitted into existing engine architectures. Further, support assemblies including the shape memory alloy damper may generally reduce the weight of the support assembly and lead to increased efficiency of the gas turbine engine. In certain situations, the support assembly including the shape memory alloy damper may also provide sufficient damping such that a squirrel casing of the support assembly is no longer necessary.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine 10 generally includes a rotatable, axial-flow fan rotor 38 configured to be surrounded by an annular nacelle 40. In particular embodiments, the LP shaft 34 may be connected directly to the fan rotor 38 or a rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 39 may be enclosed or formed as part of a fan hub 41.

It should be appreciated by those of ordinary skill in the art that the nacelle 40 may be configured to be supported relative to the core engine 14 by a plurality of substantially radially-extending, circumferentially-spaced outlet guide vanes 42. As such, the nacelle 40 may enclose the fan rotor 38 and its corresponding fan rotor blades (fan blades 44). Further, as shown, each of the fan blades 44 may extend between a root and a tip in the radial direction R relative to the centerline 12. Moreover, a downstream section 46 of the nacelle 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the nacelle 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 2:
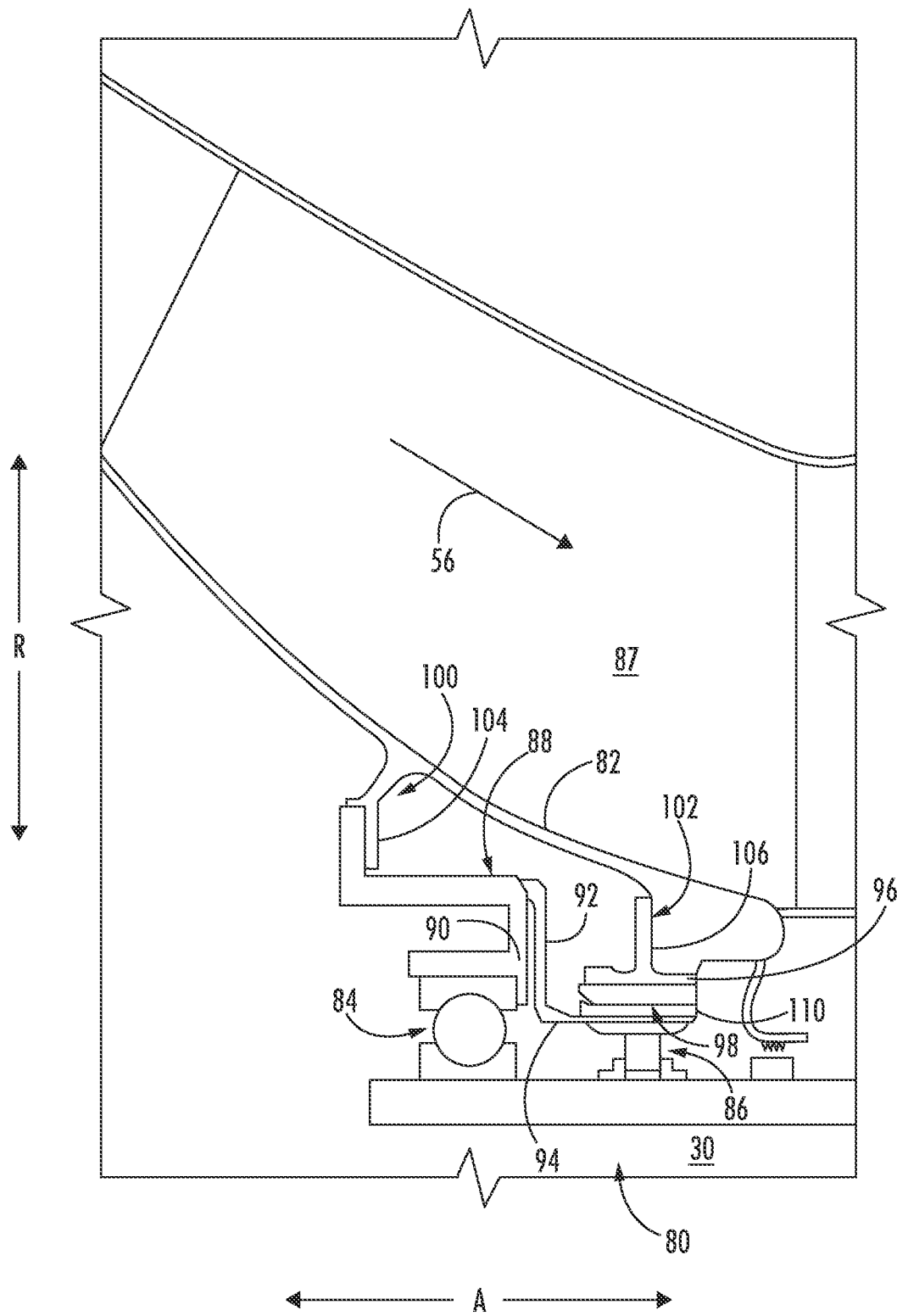
FIG. 2 illustrates a cross-sectional view of the compressor section of FIG. 1 in accordance with aspects of the present subject matter, particularly illustrating a forward end of a high pressure shaft.

Referring now to FIG. 2, a close-up view of a cross-section of the compressor section of the gas turbine engine 10 of FIG. 1 is provided. Specifically, FIG. 2 shows a forward end 80 of the HP shaft 30. The forward end 80 of the HP shaft 30 is positioned within the compressor section of the turbine engine 10, radially inward of a core air flowpath 87 for the second compressed airflow 56 flowing through the core engine 14. Notably, for the depicted embodiment, the core air flowpath 87 is defined at least in part by a static frame 82 within the compressor section of the gas turbine engine 10. For the illustrated embodiment, the static frame 82 is configured as a single piece unit. However, in some other embodiments, the static frame 82 may instead be formed of a plurality of members attached and configured in any suitable manner.

Still referring to the exemplary embodiment of FIG. 2, the gas turbine engine 10 may include a bearing supporting rotation of the HP shaft 30 at the forward end 80. More particularly, the gas turbine engine 10 may include a forward bearing 84 and an aft bearing 86, the forward and aft bearings 84, 86 each supporting rotation of the HP shaft 30 at the forward end 80 of the HP shaft 30. In these embodiments, the bearing is a load-bearing unit designed to bear the load of the HP shaft 30. In the illustrated embodiment, the forward bearing 84 is configured as a thrust bearing including a ball bearing, and the aft bearing 86 is configured as a roller bearing including a roller element bearing. It should be appreciated however that in other embodiments, the forward and/or aft bearings 84, 86 may instead have any other suitable form or configuration. Further, in some other embodiments, the gas turbine engine 10 may only include a single bearing for supporting the forward end 80 of the HP shaft 30. Additionally, it should be appreciated that FIG. 2 is provided only to place the subject matter in an exemplary field of use, and the bearing(s) 84, 86 may be included at any other position along the HP shaft 30, along the LP shaft 34 (FIG. 1), or any other suitable rotating shaft of the gas turbine engine 10 or other suitable gas turbine engine.

The gas turbine engine 10 may additionally include a support element 88 supporting the bearing, e.g., supporting either or both the forward bearing 84 and the aft bearing 86. More particularly, the support element 88 depicted includes a plurality of individual ribs spaced along a circumferential direction C. The plurality of ribs may include forward bearing support ribs 90 and aft bearing support ribs 92. In the embodiment shown in FIG. 2, the support element 88 is configured as a "squirrel casing" for the forward and aft bearings 84, 86. Additionally, the aft bearing support ribs 92 may include an axial member 94 extending generally along the axial direction A for supporting the aft bearing 86. The ribs 90, 92 of the support element 88 may be formed of a material (e.g., a metal) capable of bending or flexing during operation of the turbine engine 10 to provide a certain amount of damping for the forward and aft bearings 84, 86.

Figure 3:
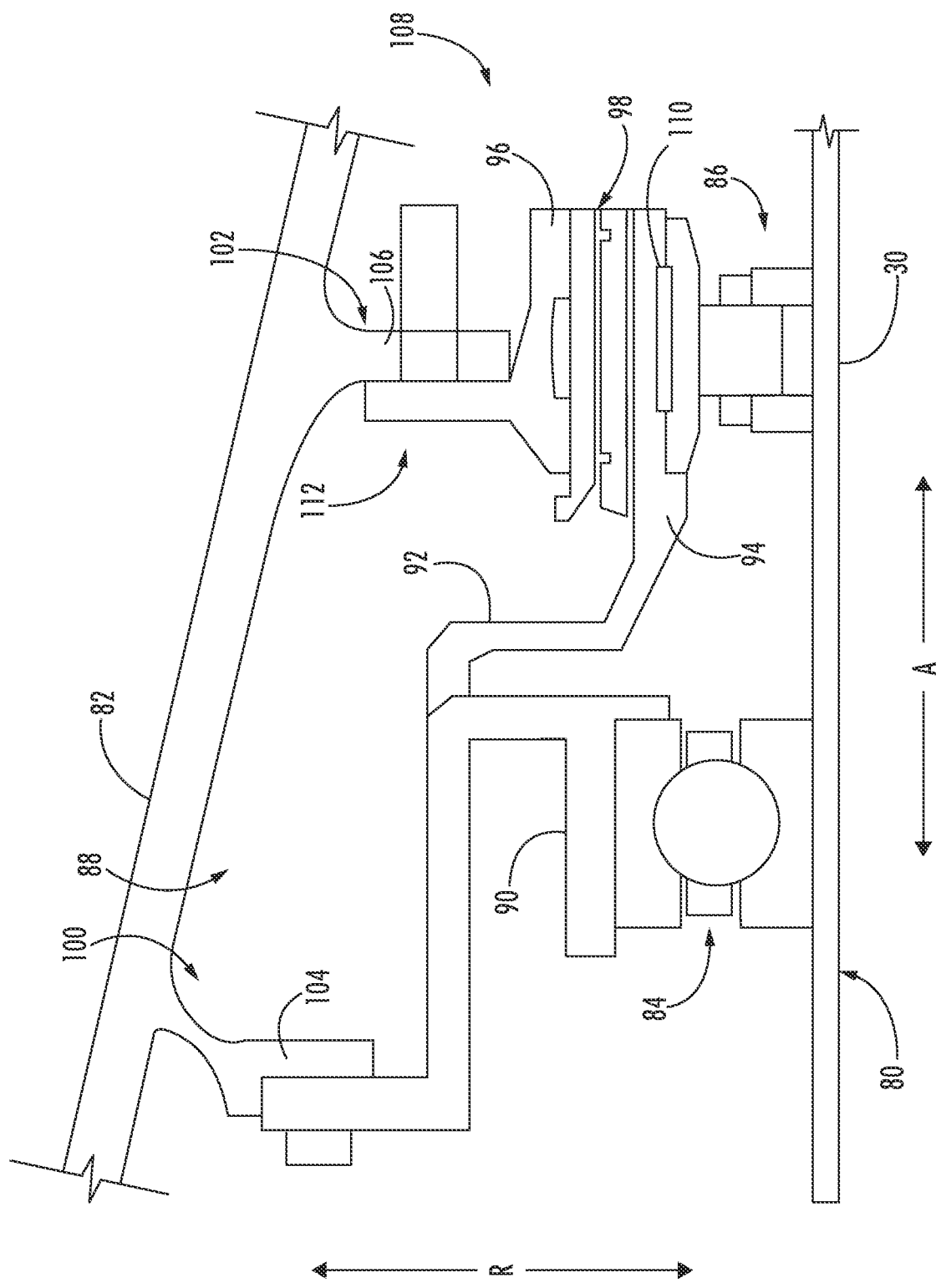
FIG. 3 illustrates a close-up view of one embodiment of forward and aft bearings of FIG. 2 in accordance with aspects of the present subject matter.

FIG. 3 provides a close-up view of an embodiment of the forward and aft bearings 84, 86 of FIG. 2. As shown in FIG. 3, the gas turbine engine 10 may further include a damper 112 that may include a squeeze film damper 96 for providing additional damping of the aft bearing 86. The squeeze film damper 96 receives a flow of fluid such as lubrication oil during operation. The squeeze film damper 96 may provide such fluid to a support surface 98 to generate a thin film of such fluid. Dynamic forces acting on the HP shaft 30 and aft bearing 86 may be absorbed or dampened by squeezing out the fluid on the support surface 98. Notably, the support element 88 may be attached to the static frame 82 at a first location 100, and, for the embodiment depicted, the squeeze film damper 96 may be attached to the static frame 82 at a second location 102. More particularly, for the depicted embodiment, the support element 88 is attached directly, without any intervening components, to a first attachment flange 104 of the static frame 82 at the first location 100, and the squeeze film damper 96 is attached directly to a second attachment flange 106 of the static frame 82 at the second location 102. The first location 100 may be spaced apart from the second location 102. Specifically, for the embodiment depicted, the first location 100 is spaced from the second location 102 at least as far as the forward bearing 84 is spaced from the aft bearing 86. However, in other embodiments (see FIGS. 4-6) one support element 88 may be attached at one location of the static frame 82 to support a single bearing, or, alternatively, each of the forward and aft bearings 84, 86 may include separate support element 88 attached to the first and second attachment flanges 104, 106 respectively. Additionally, though the squeeze film damper 96 is illustrated between the support element 88 and the static frame 82 in the embodiment of FIG. 3, it should be appreciated that in other embodiments, the squeeze film damper 96 may be arranged radially inward of the support element 88 between the support element 88 and the bearing (e.g., the aft bearing 86) or at least partially radially within the support element 88 (see, e.g., FIGS. 4 and 5).

In order to further provide damping to the bearings, a support assembly 122 (as described in regards to FIGS. 4-6) of the present gas turbine engine 10 may include a shape memory alloy damper 110 supporting at least one of the support element 88, or a bearing, such as the forward bearing 84 or aft bearing 86. The shape memory alloy damper 110 may include a shape memory alloy material. The shape memory alloy damper 110 is positioned between the support element 88 and the bearing. In some other embodiments, the shape memory alloy damper 110 may be positioned between the support element 88 and the static frame 82, between squeeze film damper 96 and the support element 88, and/or between the squeeze film damper 96 and the bearing within the support element 88 (see, e.g., FIGS. 4-6). Moreover, it should be appreciated that the shape memory alloy damper 110 may be arranged at any position between the bearing and the static frame 82.

Figure 4:
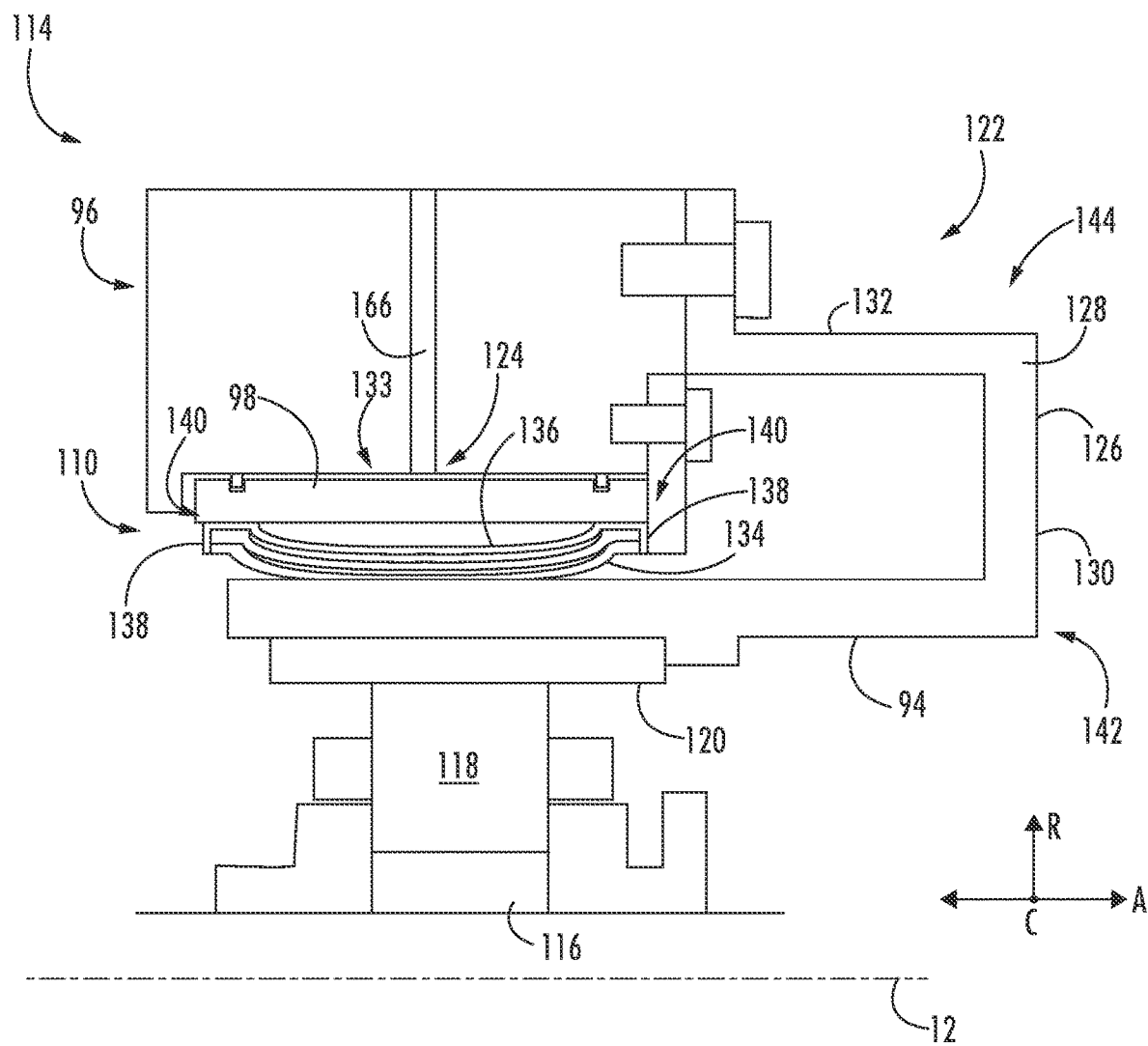
FIG. 4 illustrates a schematic view of an embodiment of a bearing assembly in accordance with aspects of the present subject matter.

Referring now FIG. 4, a schematic view of one embodiment of a bearing assembly 114 is illustrated in accordance with aspects of the present subject matter. The bearing assembly 114 may be utilized to support a rotating shaft (e.g. the HP or LP shafts 30, 34 not shown). Particularly, in the illustrated embodiment, the bearing assembly 114 is illustrated as supporting a roller bearing such as the aft bearing 86 of FIG. 3. However, in other embodiments, it should be appreciated that the bearing assembly 114 may be utilized to support a thrust bearing, such as forward bearing 84 of FIG. 3, or any other ball bearing(s), roller bearing(s), or any other suitable configuration of a bearing.

As shown, the bearing assembly 114 may include an inner race 116 coupled either directly or indirectly to one of the rotating shafts, not shown, of the gas turbine engine 10. For instance, the inner race 116 may be coupled to the HP or LP shaft 30, 34 (see, e.g., FIG. 1). As shown, a bearing 118 may be positioned radially exterior to the inner race 116 in order to support inner race 116 and thereby the rotating shaft of the gas turbine engine 10. Though one bearing 118 is illustrated in the embodiment of FIG. 4 for convenience, it should be appreciated that a plurality of bearings 118 may be arranged between the inner and outer races 116, 120 in the circumferential direction C. Though the bearing 118 is illustrated as a roller bearing, it should be appreciated that the bearing 118 may be a ball bearing, such as a ball bearing utilized in the forward bearing 84 of FIG. 3. As shown, the bearing assembly 114 may include the outer race 120 positioned radially exterior to the bearing 118. For instance, the bearing 118 may be sandwiched between the inner and outer races 116, 120 in the radial direction R. It should be appreciated that the bearing 118 may allow the inner race 116 and rotating shaft to rotate with respect to the outer race 120, which may be coupled to the static frame 82 (see, e.g., FIGS. 2 and 3) through various other components of the bearing assembly 114. As such, the bearing 118 may allow such relative rotation while still supporting the inner race 116 and thus the rotating shaft and associated components of the gas turbine engine 10.

The bearing assembly 114 may further include a support assembly 122 for the bearing 118 of the gas turbine engine 10. The support assembly 122 may include the outer race 120 supporting the bearing 118. The support assembly 122 may further include the damper 112 positioned radially exterior to the outer race 120. The damper 112 may support the outer race 120 while also providing damping to the outer race 120 and thus to the bearing 118 and subsequently the rotating shaft.

In several configurations, the damper 112 may include a squirrel casing 126. For instance, the squirrel casing 126 may be a component of or attached to the support element 88 (see FIGS. 2 and 3) or may be an individual component coupled directly or indirectly to the static frame 82 (shown as coupled to the static frame 82 intermediately via the squeeze film damper 96). It should be appreciated that the squirrel casing 126 may be directly or indirectly coupled to the outer race 120. As shown, the squirrel casing 126 may include a plurality of fingers or ribs 128. Moreover, the ribs 128 may flex or bend during operation of the gas turbine engine 10 in order to dampen forces acting on or through the bearing(s) 118 and/or the rotating shaft. For instance, in one embodiment, the ribs 128 may correspond to the forward bearing support ribs 90 or aft bearing support ribs 92. Additionally, the ribs 128 may include one or more radially aligned ribs or rib portions (radial ribs 130). The radial ribs 130 may generally dampen forces acting in the radial direction R. The ribs 128 may also include one or more axially aligned ribs or rib portions (axial ribs 132). The axial ribs 132 may generally dampen forces acting in the axial direction A. As described briefly in regards to FIGS. 2 and 3, the squirrel casing 126 may include the axial member 94 providing support to the bearing(s) 118 as well as allowing the squirrel casing 126 to dampen forces acting between the location the squirrel casing 126 is fixed to the static frame 82 and the axial member 94.

As further illustrated in the embodiment of FIG. 4, the damper 112 may include the squeeze film damper 96 positioned radially exterior to the outer race 120. For instance, as illustrated, the squeeze film damper 96 may define a fluid supply 166 extending to the support surface 98 to provide a fluid to the squeeze film damper 96. For instance, in certain embodiments, the fluid supply 166 may provide a lubrication oil. As such, the squeeze film damper 96 may utilize the fluid for squeeze damping between an outlet 124 of the fluid supply 166 and the support surface 98. More particularly, the outlet 124 may provide the fluid to a fluid reservoir 133 defined between the fluid outlet 124 and the support surface 98. As such, during operation of the gas turbine engine 10, forces acting through the damper 112 (e.g., the squeeze film damper 96) may squeeze the fluid out of the fluid reservoir 133 and dampen such forces acting through the squeeze film damper 96.

As further illustrated in reference to FIG. 4, the support assembly 122 may additionally include the shape memory alloy damper 110 positioned radially exterior to the outer race 120. The shape memory alloy damper 110 may include a plurality of sleeves 134. In an exemplary embodiment of the shape memory alloy damper 110, at least a portion of the sleeves 134 may be radially stacked. Further, the plurality of sleeves may include a cap sleeve 136. The cap sleeve 136 may generally be configured to retain the remaining sleeves 134 of the stacked portion of the sleeves 134 in the proper position and orientation within the support assembly 122. For example, in an embodiment of the cap sleeve 136, the cap sleeve 136 may include one or more retaining features 138 at end points 140 of the cap sleeve 136. As such, the retaining features 138 may prevent or reduce relative motion between the sleeves 134 in the axial and circumferential directions A, C. In additional or alternative embodiments, the cap sleeve 136 may further include retaining features 138 at end points along the circumferential direction C (not shown). In an exemplary embodiment of the shape memory alloy damper 110, one or more of the sleeves 134 may be configured as leaf dampers. In general, forces acting through the shape memory alloy damper 110 may cause bending and/or deflections of the sleeves 134. As such, the bending and/or deflections of the sleeves 134 may dampen forces acting through the shape memory alloy damper 110 and thus dampen forces acting on or through the bearing 118 and/or the rotating shaft and associated components coupled to the rotating shaft. It should be recognized that the shape memory alloy damper 110 may generally extending along and fully circumscribe the outer race 120. For instance, at least one of the sleeves 134, such as all of the sleeves 134, may extend fully along the circumferential direction C to form rings. However, in an additional or alternative embodiment, the shape memory alloy damper 110 may include segmented sleeves 134 extending along the circumferential direction C to fully circumscribe the outer race 120. For instance, the sleeves 134 may be arranged end to end along the circumferential direction C.

Still referring to the exemplary embodiment of FIG. 4, one or more of the sleeves 134 may include a shape memory alloy (SMA) material. In an additional or alternative embodiment, each of the sleeves 134 may include the SMA material. In some embodiments, the SMA damper 110 (such as one or more or all of the sleeves 134) may include the SMA material as a major constituent, in an amount greater than 50 wt. % of the SMA damper 110. In certain embodiments, the SMA damper 110 (such as some or all of the sleeves 134) may be essentially composed of the SMA material. A SMA material is generally an alloy capable of returning to its original shape after being deformed. Further, SMA materials may act as a lightweight, solid-state alternative to traditional actuators. For instance, certain SMA materials may be heated in order to return a deformed SMA to its pre-deformed shape. A SMA material may also provide varying stiffness, in a pre-determined manner, in response to certain ranges of temperatures. The change in stiffness of the shape memory alloy is due to a temperature related, solid state micro-structural phase change that enables the alloy to change from one physical shape to another physical shape. The changes in stiffness of the SMA material may be developed by working and annealing a preform of the alloy at or above a temperature at which the solid state microstructural phase change of the shape memory alloy occurs. The temperature at which such phase change occurs is generally referred to as the critical temperature or transition temperature of the alloy. In the manufacture of the SMA damper 110 intended to change stiffness during operation of the support assembly 122, the SMA damper 110 (e.g., the sleeves 134 of the SMA damper 110) may be formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the SMA damper 110 may define a first stiffness at a first temperature and define a second stiffness at a second temperature, wherein the second temperature is different from the first temperature. Further, in some embodiments, one of the first temperature and the second temperature is below the transition temperature and the other one may be at or above the transition temperature. Thus, in some embodiments, the first temperature may be below the transition temperature and the second temperature may be at or above the transition temperature, while in some other embodiments, the first temperature may be at or above the transition temperature and the second temperature may be below the transition temperature.

Exemplary, but non-limiting examples of SMAs that may be suitable for forming the SMA damper 110 may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA may include a nickel-aluminum based alloys, copper-aluminum-nickel alloy, or alloys containing zinc, copper, gold, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMA materials may also display superelasticity. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

In certain embodiments, such as the exemplary embodiment of FIG. 4, the squeeze film damper 96 including the support surface 98 may be positioned radially exterior to the SMA damper 110. As such, it should be appreciated that the damping provided by the support assembly 122 may be a combination of the damping provided by the SMA damper 110 and the damper 112. For instance, the damping provided by the support assembly 122 may be a combination of the damping provided by the SMA damper 110, the squeeze film damper 96, the squirrel casing 126, and/or any other components of the support assembly 122. In certain embodiments, such as the exemplary embodiment of FIG. 4, the SMA damper 110 and squeeze film damper 96 may be radially positioned within the squirrel casing 126. For example, the squeeze film damper 96 and SMA damper 110 may be positioned between a radially innermost portion 142 and a radially outermost portion 144 of the squirrel casing 126. However, in alternative embodiments, the squeeze film damper 96 and/or SMA damper 110 may be positioned radially outward from the radially outermost portion 144 and/or radially inward from the radially innermost portion 142 of the squirrel casing 126.

Figure 5:
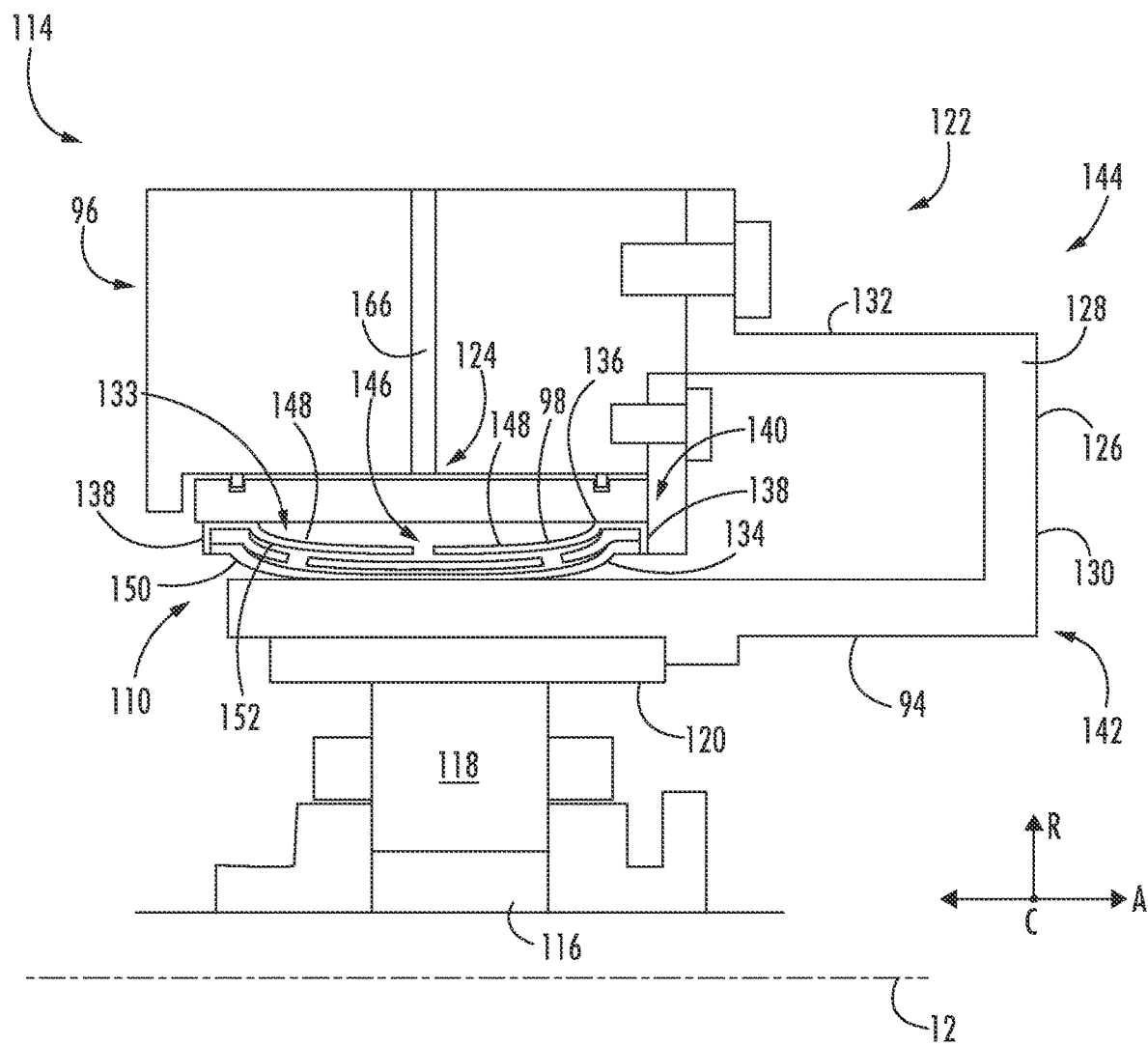
FIG. 5 illustrates a schematic view of an embodiment of a support assembly in accordance with aspects of the present subject matter, particularly illustrating a support assembly where a shape memory alloy damper at least partially defines a fluid reservoir of a squeeze film damper.

Referring now to FIG. 5, a schematic view of another exemplary embodiment of the support assembly 122 is illustrated in accordance with aspects of the present subject matter. Particularly, FIG. 5 illustrates an embodiment where the SMA damper 110 at least partially defines the fluid reservoir 133. As shown, the squeeze film damper 96 may be positioned radially outward from the SMA damper 110. Further, the squeeze film damper 96 may be configured to provide a fluid (such as via outlet 124) to the fluid reservoir 133 defined between the squeeze film damper 96 and the SMA damper 110. In such an embodiment, one or more of the sleeves 134 may of the SMA damper 110 may serve as the support surface 98 of the squeeze film damper 96. For example, the cap sleeve 136 may serve as the support surface 98. As such, loads acting through the support assembly 122 may squeeze the fluid out of the fluid reservoir 133 and provide damping to the bearing 118 and/or the rotating shaft of the gas turbine engine 10.

Referring still to the exemplary embodiment of FIG. 5, in certain additional or alternative embodiments the sleeves 134 may be stacked such that a fluid passage 146 is defined at least partially through the sleeves 134. For example, in an exemplary embodiment, one or more layers of the stacked sleeves 134 may include sleeve segments 148 defining the fluid passage 146 through the sleeve 134. For instance, layers of the stacked sleeves 134 may include sleeve segments 148 in order to define the fluid passage 146 at least partially through the SMA damper 110. In an additional or alternative embodiment, one or more of the sleeves 134 may define one or more cavities or mesh portions in order to define the fluid passage 146. As additionally shown, in an exemplary embodiment, a radially innermost sleeve 150 of the sleeves 134 may define a seal of the SMA damper 110. For instance, the radially innermost sleeve 150 may not include the sleeve segments 148, cavities, and/or mesh portion in order to retain the fluid within the SMA damper 110. As shown, the fluid passage 146 may be fluidly coupled to the fluid reservoir 133 in order to provide fluid to the fluid passage 146. As such, additional or alternative embodiments of the SMA damper 110 may define one or more radial squeeze film gaps 152 in-between two or more of the radially stacked sleeves 134.

It should be appreciated that embodiments of the SMA damper 110 including radial squeeze film gap(s) 152 may generally act in the same and/or similar fashion as the squeeze film damper 96 described herein. For instance, the radial squeeze film gap(s) 152 may be fluidly coupled to the fluid reservoir 133 via the fluid passage 146 in order to receive a fluid (e.g., a lubricating oil from the fluid supply 166). Additionally, when forces act through the SMA damper 110, the sleeves 134 may be compressed and thus reduce or close the radial squeeze film gap(s) 152. As such, any fluid within the radial squeeze film gap(s) 152 may be forced out of the SMA damper 110 through gaps between the individual sleeves 134 and the cap sleeve 136. For instance, the fluid may be squeezed out of the radial squeeze film gap(s) 152 and generally at the end points 140 of the cap sleeve 136, e.g., such as at the retaining features 138. For instance, in several embodiments, the damping provided by the support assembly 122 may be a combination of damping provided by one or more of bending/compression of the SMA material of the sleeves 134 of the SMA damper 110, squeeze film damping of the radial squeeze film gap(s) 152, squeeze film damping of the squeeze film damper 96, and/or the bending/deflections of the squirrel casing 126.

Figure 6:
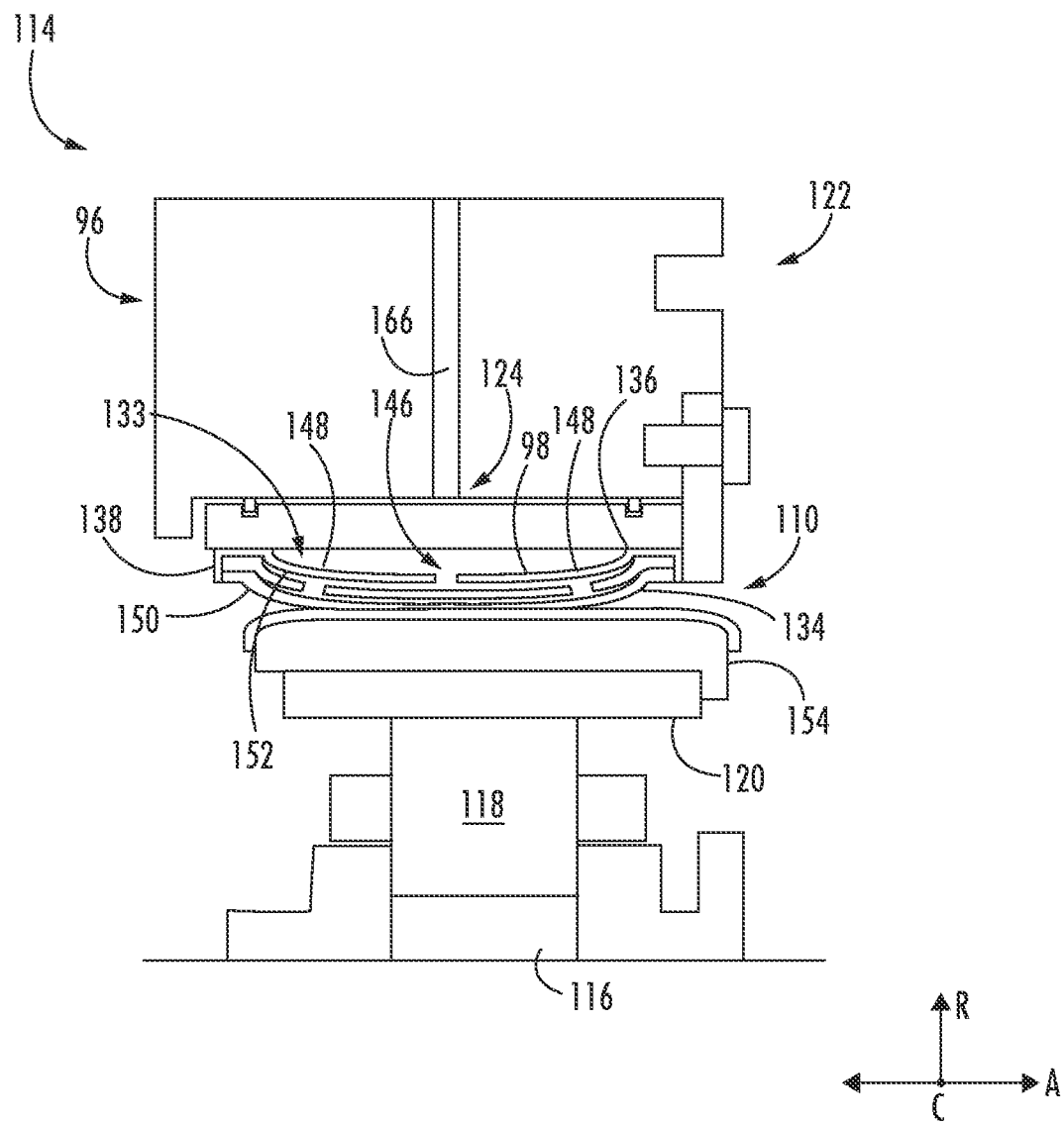
FIG. 6 illustrates a schematic view of another embodiment of the support assembly in accordance with aspects of the present subject matter, particularly illustrating the support assembly without a squirrel casing.

Referring now to FIG. 6, another embodiment of the support assembly 122 is illustrated schematically in accordance with aspects of the present subject matter. Particularly, FIG. 6 illustrates a support assembly 122 without a squirrel casing 126. In certain embodiments, the damping provided by the squeeze film damper 96 and the SMA damper 110 (such as an SMA damper 110 including one or more radial squeeze film gaps 152) may provide sufficient damping to the bearing 118 such that squirrel casing 126 and damping provided by the squirrel casing 126 is not necessary. As such, the squirrel casing 126 may be eliminated and thus decrease the weight and complexity of the support assembly 122 and improve the efficiency of the gas turbine engine 10. In such an embodiment, the squeeze film damper 96 and SMA damper 110 may be positioned radially between the outer race 120 and the static frame 82 (FIGS. 2 and 3) to provide damping to the bearing 118. For instance, the outer race 120 may be coupled to the static frame 82 through the SMA damper 110 and the squeeze film damper 96. In an exemplary embodiment, as shown in FIG. 6, the support assembly 122 may further include a support component 154 arranged radially between the outer race 120 and the SMA damper 110 in order to secure the SMA damper 110 between the support component 154 and squeeze film damper 96.

Figure 7:
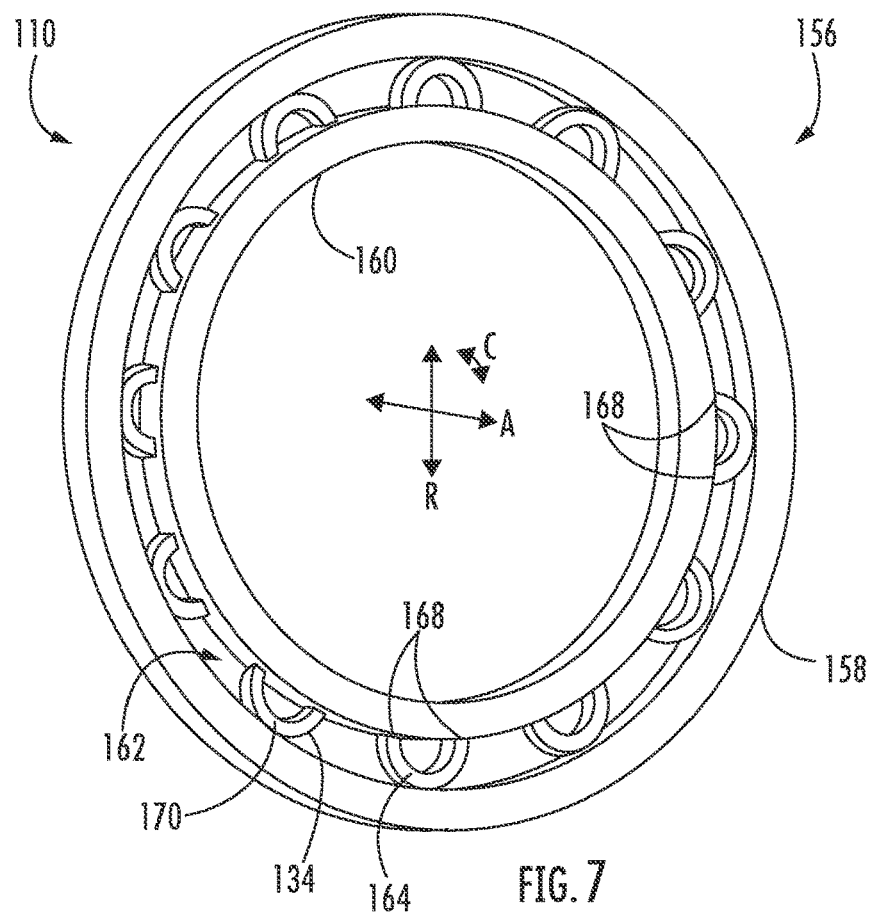
FIG. 7 illustrates a pictorial view of another embodiment of the shape memory alloy damper in accordance with aspects of the present subject matter, particularly illustrating the shape memory alloy damper configured as a ringed shape memory alloy damper.

Referring now to FIG. 7, a pictorial view of another embodiment of the SMA damper 110 is illustrated in accordance with aspects of the present subject matter. Particularly, FIG. 7 illustrates the SMA damper 110 configured as a ringed SMA damper 156. It should be appreciated that the ringed SMA damper 156 may generally be utilized at any location the SMA damper 110 may be, as described generally in FIGS. 2-6. The ringed SMA damper 156 may include an outer ring 158 circumscribing the bearing 118 in the circumferential direction C. The ringed SMA damper 156 may further include an inner ring 160 positioned radially interior to the outer ring 158 and circumscribing the bearing 118 in the circumferential direction C. Moreover, the inner and outer rings 158, 160 may define a gap 162 therebetween. In certain embodiments, the inner ring 158 and/or outer ring 160 may include at least one of a metal, composite, or SMA material.

As illustrated in the exemplary embodiment of FIG. 7, the sleeves 134 of the ringed SMA damper 156 may be arranged within the gap 162. For instance, one or more of the sleeves 134 may be curved beams 164. In one exemplary embodiment, the curved beams 164 may be arranged within the gap 162 in the circumferential direction C. It should be appreciated that one or more of the curved beams 164 may include an SMA material as described herein. For instance, each of the curved beams 164 may include the SMA material. Further, it should be recognized that one or more of the curved beams 164 may include radially stacked sleeves 134 (see, e.g., FIGS. 4-6). For instance, each of the curved beams 164 may include two or more radially stacked sleeves 134.

As shown, the curved beam(s) 164 may be coupled to one of the inner ring 160 or the outer ring 158 at ends 168 of the curved beam(s) 164. In the exemplary embodiment of FIG. 7, each of the curved beams 164 is coupled to the inner ring 160 at the ends 168 and extends to the outer ring 158. However, in additional or alternative embodiments, one or more curved beams 164 may be coupled to outer ring 158 at ends 168 and extend to the inner ring 160. It should be appreciated that in other embodiments, a portion of the curved beams 164 may be attached to the inner ring 160 at ends 168 while another portion of the curved beams 164 may be attached to the outer ring 158 at ends 168. In certain embodiments, one or more of the curved beams 164 may be secured within the gap 162 via friction fitting. For instance, friction between a top 170 of the curved beam(s) 164 and one of the inner or outer rings 160, 158 may secure the curved beams 164 within the gap 162 as well as secure the outer and inner rings 158, 160 together. In an additional or alternative embodiment, top 170 the curved beam(s) 164 may be coupled to the inner or outer ring 160, 158 opposite the ring 158, 160 the ends 168 of the curved beam(s) 164 are coupled to. The curved beam(s) 164 may generally be coupled to one or both of the rings 158, 160 via fastening (bolts, nuts, rivets, etc.), adhesion, welding, or any other suitable means. In certain embodiments, one or more of the curved beams 164 may be formed integrally with one or both of the inner and outer rings 160, 158.

The ringed SMA damper 156 may generally provide damping to the outer race 120 and/or the bearing 118 (see, e.g., FIGS. 4-6) via bending or deflection of the sleeves 134, such as one or more curved beams 164. More particularly, forces acting through the support assembly 122, and thus the ringed SMA damper 156, may place one or more circumferential locations of the ringed SMA damper 156 in compression. As such, the compression may reduce the gap 162 as such locations causing the curved beams 164 to bend or flex. Such bending or flexing may dampen forces acting through the ringed SMA damper 156 and thus dampen forces acting on the bearing 118.

Figure 8:
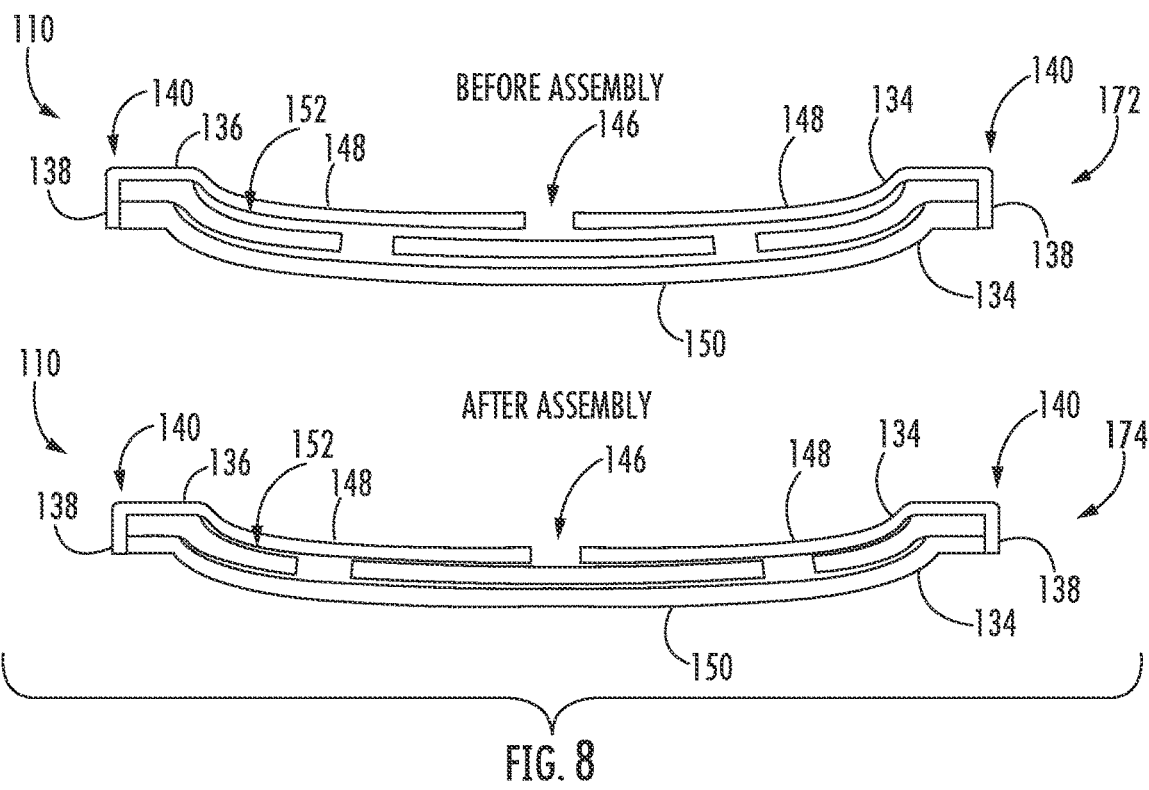
FIG. 8 illustrates a schematic view of an embodiment of the shape memory alloy damper before and after assembly with the bearing assembly, particularly illustrating stacked sleeves of the shape memory alloy damper.

Referring now to FIGS. 8 and 9, multiple views of embodiments of sleeves 134 of SMA dampers 110 are illustrated before assembly and after assembly. Particularly, FIG. 8 illustrates an embodiment of stacked sleeves 134 of the SMA damper 110, and FIG. 9 illustrates an embodiment of a curved beam 164. It should be appreciated that the sleeves 134 of FIGS. 8 and 9 may generally be utilized in the exemplary support assemblies 122 as described generally in regards to FIGS. 2-6 or any other suitable support assembly 122. Additionally, the SMA dampers 110 of FIGS. 8 and 9 may be utilized in any suitable gas turbine engine, such as the gas turbine engine 10 described in regards to FIG. 1. Though the embodiment of the curved beam 164 is illustrated as including one sleeve 134 in the embodiment of FIG. 9, it should be appreciated the curved beam may include two or more stacked sleeves 134 defining the curved beam 164.

As shown particularly in regard to FIG. 8, sleeves 134 may be in an unstressed state 172 before assembly of the SMA damper 110 within the support assembly 122. Moreover, after assembly of the SMA damper 110 with the support assembly 122 and/or the bearing assembly 114 the sleeves 134 may be in a pre-stressed state 174. For instance, the sleeves 134 of the SMA damper 110 may be placed in compression in the pre-stressed state 174. Referring particularly to the exemplary embodiment of FIG. 9, the curved beam 164 may be in the unstressed state 172 before assembly of the curved beam 164 with the outer and inner rings 158, 160 to form the ringed SMA damper 156 (FIG. 7). Moreover, after assembly of the curved beam 164 with the outer and inner rings 158, 160 to form the ringed SMA damper 156, the curved beam 164 may be in the pre-stressed state 174. For instance, one or more of the curved beams 164 may be in compression between the outer and inner rings 158, 160.

In some embodiments, the SMA damper 110 and/or the sleeves 134 of the SMA damper 110 may be in a pre-strained or pre-stressed condition (e.g., the pre-stressed state 174). The SMA damper 110 in the pre-stressed condition may shift the hysteresis cycle of the SMA damper 110 to a range of stresses that is different from that of a non-pre-stressed SMA damper 110 (e.g., when the sleeves 134 are in the unstressed state 172). The pre-stressing further serves to maximize the damping function of the SMA damper 110 so that the material is active at the maximum stresses generated. More particularly, placing the sleeves 134 of the SMA damper 110 in a pre-stress position may allow for sleeves 134 to enter a hysteretic bending regime, without requiring a relatively large amount of displacement. For instance in certain embodiments, the sleeves 134 of the SMA damper 110 may be pre-stressed between 70 GPa and 150 GPa.

Figure 11:
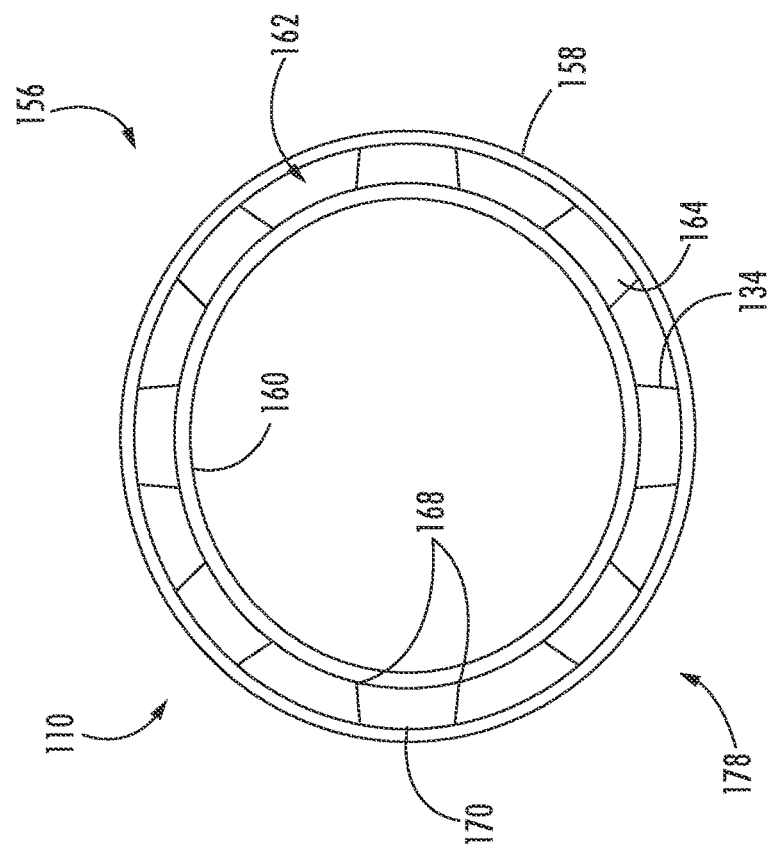
FIG. 11 illustrates a schematic view of the ringed shape memory alloy damper of FIG. 10 in an assembled state in accordance with aspects of the present subject matter.
Figure 10:
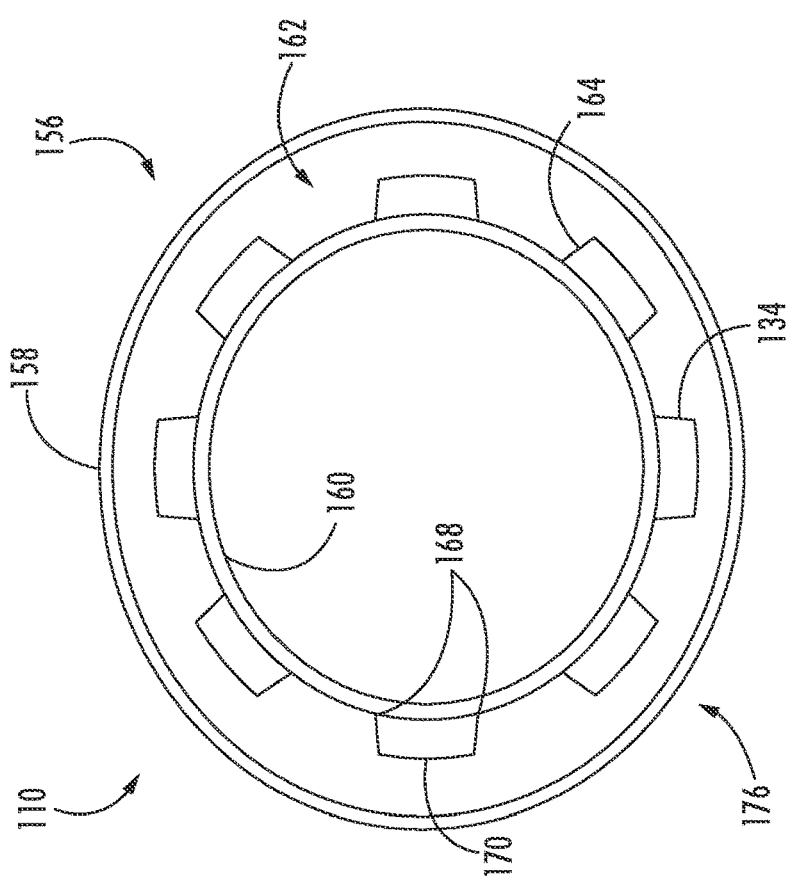
FIG. 10 illustrates a schematic view of an embodiment of the ringed shape memory alloy damper in an unassembled state in accordance with aspects of the present subject matter.

Referring now to FIGS. 10 and 11 multiple schematic views of the ringed SMA damper 156 are illustrated in accordance with aspects of the present subject matter. Particularly, FIG. 10 illustrates the ringed SMA damper 156 in an unassembled state 176, and FIG. 11 illustrates the ringed SMA damper 156 in an assembled state 178. Referring to FIG. 10, in one embodiment, the curved beams 164 may be coupled to the inner ring 160 at ends 168 of curved beams 164. It should be appreciated that, in other embodiments, one or more of the curved beams 164 may be coupled to the outer ring 158. After coupling the curved beams 164 to the inner ring 160, the outer ring 158 may be heated in order to expand the outer ring 158. Subsequently, the inner ring 160 and attached curved beams 164 may be arranged within the outer ring 158. It should be appreciated that the curved beams 164 may be in the unstressed state 172.

Referring now particularly to FIG. 11, the outer ring 158 may be allowed to cool in order to reduce the gap 162 between the inner ring 160 and the outer ring 158. Further, the outer ring 158 may be sized such that the outer ring 158 shrinks enough to form a friction fitting between the curved beams 164 (e.g. the tops 170 of the curved beam) and the outer ring 158 and thus form the ringed SMA damper 156 in the assembled state 178. In additional or alternative embodiments, the outer ring 158 may be sized such that the outer ring 158 places the curved beams 164 in compression between the outer and inner rings 158, 160. For instance, the outer ring 158 may be sized such that the outer ring 158 shrinks to a degree sufficient to place one or more of the curved beams 164 in the pre-stressed state 174 (see, e.g., FIG. 9).

In general, the exemplary embodiments of the support assembly 122 and SMA damper 110, described herein, may be manufactured or formed using any suitable process. For instance, the SMA damper 110 or components thereof may be stamped or formed from laser electric discharge machining (EDM), milling, etc. However, in accordance with several aspects of the present subject matter, the SMA damper 110 may be formed using an additive-manufacturing process, such as a 3D printing process, or via casting. The use of such processes may allow the SMA damper 110 to be formed integrally and/or integrally with other components of the support assembly 122, as a single monolithic component, or as any suitable number of sub-components. Forming SMA damper 110 via additive manufacturing may allow the sleeves 134 to be integrally formed and include a variety of features not possible when using prior manufacturing methods. For example, the additive manufacturing methods described herein enable the manufacture of the sleeves 134, sleeve segments 148, and/or curved beams 164 having any suitable size and shape with one or more configurations, some of these novel features are described herein.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, in various embodiments of the SMA damper 110 described herein, the material may include an SMA material. Further, in accordance with other exemplary embodiments of the present subject matter, the additively manufactured components described herein may be formed at least in part of materials including but not limited to pure metals, nickel alloys, chrome alloys, titanium, titanium alloys, magnesium, magnesium alloys, aluminum, aluminum alloys, iron, iron alloys, stainless steel, nickel or cobalt based superalloys (e.g., those available under the name Inconel® available from Special Metals Corporation), as well as SMA materials described herein. These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the SMA damper 110 including the sleeves 134, curved beam(s) 164, outer ring 158, and/or inner ring 160 as well as components of the support assembly 122, such as the squirrel casing 126, squeeze film damper 96, and/or outer race 120. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the SMA damper 110 described herein. For example, such components may include thin additively manufactured layers and structures. In addition, the additive manufacturing process enables the manufacture of a single component having different materials such that different portions of the component may exhibit different performance characteristics, such as forming all or part of the SMA damper 110 from a SMA material. The successive, additive nature of the manufacturing process enables the construction of these novel features. As a result, the support assembly 122 and/or SMA damper 110 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A support assembly for a bearing of a gas turbine engine including a shaft extending along an axial direction, the support assembly including an outer race positioned radially exterior to the bearing such that the outer race supports the bearing; and a shape memory alloy damper positioned radially exterior to the outer race and at least partially supporting the outer race, the shape memory alloy damper including a plurality of sleeves, at least one sleeve of the plurality of sleeves comprising a shape memory alloy material.

2. The support assembly of clause 1, further comprising an additional damper, wherein the shape memory alloy is disposed radially between the outer race and at least a portion of the additional damper.

3. The support assembly of any preceding clause, wherein at least a portion the plurality of sleeves are radially stacked.

4. The support assembly of any preceding clause, wherein the portion of the plurality of sleeves comprises a cap sleeve including retaining features at endpoints of the cap sleeve, wherein the cap sleeve is configured to retain the remaining sleeves of the portion of the plurality of sleeves within the retaining features.

5. The support assembly of any preceding clause, wherein the plurality of sleeves comprises at least one leaf damper.

6. The support assembly of any preceding clause, wherein at least one sleeve of the plurality of sleeves is pre-stressed.

7. The support assembly of any preceding clause, wherein the additional damper comprises a squeeze film damper configured to provide damping to the outer race.

8. The support assembly of any preceding clause, wherein the additional damper comprises a squeeze film damper configured to provide damping to the outer race, and wherein the squeeze film damper is positioned radially exterior to the shape memory alloy damper such that the squeeze film damper and shape memory alloy damper define a fluid reservoir therebetween.

9. The support assembly of any preceding clause, wherein at least a portion of the plurality of sleeves are radially stacked such that a fluid passage is defined at least partially through the portion of the plurality of sleeves, the fluid passage fluidly coupled to the fluid reservoir.

10. The support assembly of any preceding clause, wherein the stacked portion of the plurality of sleeves defines one or more radial squeeze film gaps between stacked sleeves configured to receive a fluid.

11. The support assembly of any preceding clause, wherein the additional damper comprises a squirrel casing configured to provide damping to the outer race.

12. The support assembly of any preceding clause, wherein the additional damper further comprises a squeeze film damper, and wherein the shape memory alloy damper and squeeze film damper are positioned between a radially innermost portion and a radially outermost portion of the squirrel casing.

13. The support assembly of any preceding clause, wherein the shape memory alloy damper comprises an outer ring and an inner ring positioned radially interior to the outer ring such that the inner ring and outer ring define a gap therebetween, and wherein the plurality of sleeves are configured as curved beams, each curved beam coupled to one of the inner or outer ring at ends of the curved beam and extending to the other of the inner or outer ring.

14. The support assembly of any preceding clause, wherein the plurality of curved beams are arranged within the gap in a circumferential direction.

15. A gas turbine engine defining a central axis, the gas turbine engine comprising a shaft extending along the central axis; a compressor attached to the shaft and extending radially about the central axis; a combustor positioned downstream of the compressor to receive a compressed fluid therefrom; a turbine mounted on the shaft downstream of the combustor to provide a rotational force to the compressor; a bearing assembly supporting the shaft, the bearing assembly including an inner race coupled to the shaft, a bearing positioned radially exterior to the inner race and supporting the shaft, and an outer race positioned radially exterior to the bearing such that the bearing is radially positioned between the inner and outer races; and a shape memory alloy damper positioned radially exterior to the outer race and at least partially supporting the outer race, the shape memory alloy damper including a plurality of sleeves, at least one sleeve of the plurality of sleeves comprising a shape memory alloy material.

16. The gas turbine engine of any preceding clause, further comprising an additional damper, wherein the shape memory alloy is disposed radially between the outer race and at least a portion of the additional damper.

17. The gas turbine engine of any preceding clause, wherein at least a portion of the plurality of sleeves are radially stacked.

18. The gas turbine engine of any preceding clause, wherein the additional damper comprises a squeeze film damper configured to provide damping to the outer race, and wherein the squeeze film damper is positioned radially exterior to the shape memory alloy damper such that the squeeze film damper and shape memory alloy damper define a fluid reservoir therebetween.

19. The gas turbine engine of any preceding clause, wherein a portion of the plurality of sleeves are stacked such that a fluid passage is defined at least partially through the portion of the plurality of sleeves, the fluid passage fluidly coupled to the fluid reservoir, and wherein the stacked portion of the plurality of sleeves defines one or more radial squeeze film gaps between stacked sleeves configured to receive a fluid.

20. The gas turbine engine of any preceding clause, wherein the additional damper further comprises a squirrel casing configured to provide damping to the outer race, wherein the shape memory alloy damper and squeeze film damper are positioned between a radially innermost portion and a radially outermost portion of the squirrel casing.

21. The gas turbine engine of any preceding clause, wherein the shape memory alloy damper comprises an outer ring and an inner ring positioned radially interior to the outer ring such that the inner ring and outer ring define a gap therebetween, and wherein the plurality of sleeves are configured as curved beams, each curved beam coupled to one of the inner or outer ring at ends of the curved beam and extending to the other of the inner or outer ring, and wherein the plurality of curved beams are arranged within the gap in a circumferential direction.

22. The gas turbine engine of any preceding clause, wherein the bearing comprises at least one of a thrust bearing or a roller bearing.

What is claimed is:

1. A support assembly for a bearing of a gas turbine engine including a shaft extending along an axial direction, the support assembly comprising:
   an outer race positioned radially exterior to the bearing such that the outer race supports the bearing; and
   a squeeze film damper including a shape memory alloy damper positioned radially exterior to the outer race and at least partially supporting the outer race, the shape memory alloy damper comprising a shape memory alloy material, wherein the shape memory alloy damper at least partially defines a fluid reservoir of the squeeze film damper, and wherein the fluid reservoir is defined radially exterior to the shape memory alloy damper.

2. The support assembly of claim 1, wherein a fluid passage is defined at least partially through the shape memory alloy damper, the fluid passage fluidly coupled to the fluid reservoir.

3. The support assembly of claim 2, wherein the shape memory alloy damper further defines one or more radial squeeze film gaps fluidly coupled to the fluid passage.

4. The support assembly of claim 1, further comprising: a squirrel casing configured to provide damping to the outer race, wherein the squeeze film damper is positioned between a radially innermost portion and a radially outermost portion of the squirrel casing.

5. A support assembly for a bearing of a gas turbine engine including a shaft extending along an axial direction, the support assembly comprising:
   an outer race positioned radially exterior to the bearing such that the outer race supports the bearing; and
   a shape memory alloy damper positioned radially exterior to the outer race and at least partially supporting the outer race, the shape memory alloy damper comprising a shape memory alloy material wherein the shape memory alloy damper comprises an outer ring, an inner ring positioned radially interior to the outer ring such that the inner ring and outer ring define a gap therebetween, and a plurality of curved beams, each curved beam coupled to one of the inner or outer ring at ends of the curved beam and extending to the other of the inner or outer ring.

6. The support assembly of claim 5, wherein the plurality of curved beams are arranged within the gap in a circumferential direction.

* * * * *